(12) United States Patent (10) Patent No.: US 8,106,904 B2
Dietrich, Jr. et al. (45) Date of Patent: Jan. 31, 2012

(54) SHADER PROGRAM GENERATION SYSTEM AND METHOD

(75) Inventors: Douglas Sim Dietrich, Jr., Los Gatos, CA (US); Ashutosh G. Rege, San Carlos, CA (US); Christopher T. Maughan, York (GB)

(73) Assignee: NVIDIA Corporation, Santa Clara, CA (US)

( * ) Notice: Subject to any disclaimer, the term of this patent is extended or adjusted under 35 U.S.C. 154(b) by 1469 days.

(21) Appl. No.: 11/181,180

(22) Filed: Jul. 13, 2005

(65) Prior Publication Data

US 2005/0251787 A1 Nov. 10, 2005

Related U.S. Application Data

(63) Continuation of application No. 10/102,989, filed on Mar. 20, 2002, now Pat. No. 7,009,605.

(51) Int. Cl.
*G06T 15/00* (2011.01)

(52) U.S. Cl. ........ 345/419; 345/418; 345/426; 345/428; 345/619

(58) Field of Classification Search .................... 45/419; 345/418, 419, 426, 428, 619
See application file for complete search history.

(56) References Cited

U.S. PATENT DOCUMENTS

| | | | |
|---|---|---|---|
| 5,706,415 A | 1/1998 | Kelley et al. ................. | 395/126 |
| 5,793,374 A | 8/1998 | Guenter et al. | |
| 6,046,744 A * | 4/2000 | Hoppe .......................... | 345/419 |
| 6,204,851 B1 | 3/2001 | Netschke et al. | |
| 6,229,553 B1 | 5/2001 | Duluk, Jr. et al. ............. | 345/506 |
| 6,236,413 B1 | 5/2001 | Gossett et al. ................ | 345/506 |
| 6,268,875 B1 | 7/2001 | Duluk, Jr. et al. ............. | 345/506 |
| 6,288,730 B1 | 9/2001 | Duluk, Jr. et al. ............. | 345/552 |
| 6,417,858 B1 | 7/2002 | Bosch et al. .................. | 345/522 |
| 6,476,807 B1 | 11/2002 | Duluk, Jr. et al. ............. | 345/421 |
| 6,525,737 B1 | 2/2003 | Duluk, Jr. et al. ............. | 345/506 |
| 6,552,723 B1 | 4/2003 | Duluk, Jr. et al. ............. | 345/419 |
| 6,577,305 B1 | 6/2003 | Duluk, Jr. et al. ............. | 345/419 |
| 6,577,317 B1 | 6/2003 | Duluk, Jr. et al. ............. | 345/506 |
| 6,597,363 B1 | 7/2003 | Duluk, Jr. et al. ............. | 345/506 |
| 6,614,444 B1 | 9/2003 | Duluk, Jr. et al. ............. | 345/581 |
| 6,664,959 B2 | 12/2003 | Duluk, Jr. et al. ............. | 345/422 |
| 6,693,639 B2 | 2/2004 | Duluk, Jr. et al. ............. | 345/506 |
| 6,717,576 B1 | 4/2004 | Duluk, Jr. et al. ............. | 345/419 |
| 6,771,264 B1 | 8/2004 | Duluk et al. .................. | 345/426 |
| 7,164,426 B1 | 1/2007 | Duluk, Jr. et al. ............. | 345/564 |

(Continued)

FOREIGN PATENT DOCUMENTS

AU 5576599 3/2000

(Continued)

OTHER PUBLICATIONS

Lindholm E et al. "A User-Programmable Vertex Engine" Computer Graphics. Siggraph 2001.Conference Proceedings. Los Angeles, CA Aug. 12-17, 2001 New York, NY: ACM, US pp. 149-158.

(Continued)

*Primary Examiner* — Phu Nguyen
(74) *Attorney, Agent, or Firm* — Zilka-Kotab, PC

(57) ABSTRACT

A method and computer program product are provided for generating a shader program. Included is a file associated with a graphics effect. In use, a shader program is generated based on processing of the file to apply the graphics effect to an object.

23 Claims, 18 Drawing Sheets

U.S. PATENT DOCUMENTS

| | | |
|---|---|---|
| 7,167,181 B2 | 1/2007 | Duluk, Jr. et al. ............. 345/506 |
| 2002/0196251 A1 | 12/2002 | Duluk, Jr. et al. ............. 345/420 |
| 2003/0067468 A1 | 4/2003 | Duluk, Jr. et al. ............. 345/506 |
| 2004/0130552 A1 | 7/2004 | Duluk, Jr. et al. ............. 345/506 |
| 2007/0165035 A1 | 7/2007 | Duluk, Jr. et al. ............. 345/506 |

FOREIGN PATENT DOCUMENTS

| | | |
|---|---|---|
| AU | 5580799 | 3/2000 |
| AU | 5686199 | 3/2000 |
| AU | 5686299 | 3/2000 |
| AU | 5687599 | 3/2000 |
| AU | 5688199 | 3/2000 |
| AU | 5690499 | 3/2000 |
| AU | 5782599 | 3/2000 |
| AU | 5687899 | 4/2000 |
| AU | 5779799 | 6/2000 |
| EP | 1105844 | 6/2001 |
| EP | 1138023 | 10/2001 |
| JP | 06236445 | 8/1994 |
| JP | 2004/272928 | 9/2004 |
| WO | 9952083 A1 | 10/1999 |
| WO | 00/10372 | 3/2000 |
| WO | 00/11562 | 3/2000 |
| WO | 00/11602 | 3/2000 |
| WO | 00/11603 | 3/2000 |
| WO | 00/11604 | 3/2000 |
| WO | 00/11605 | 3/2000 |
| WO | 00/11607 | 3/2000 |
| WO | 00/11613 | 3/2000 |
| WO | 00/11614 | 3/2000 |
| WO | 00/19377 | 4/2000 |
| WO | 00/30040 | 5/2000 |
| WO | 0152090 A2 | 7/2001 |

OTHER PUBLICATIONS

Proudfoot K et al. "A Real-Time Procedural Shading System for Programmable Graphics Hardware" Computer Graphics Proceedings. Siggraph 2001 ACM New York, NY, USA, pp. 159-170.

Peercy M.S. et al. "Interactive Multi-Pass Programmable Shading" Computer Graphics Proceedsing. Annual Conference Series 2000 ACM New York, NY, USA, pp. 425-432.

Lalonde P. et al. "Shader-Driven Compilation of Rendering Assets" ACM Transactions on Graphics ACM USA, vol. 21, No. 3, Jul. 2002 pp. 713-720.

Examiner's Report from Canadian Patent Application No. 2,479,931, dated Feb. 6, 2008.

Notice of Reasons for Rejection from Japanese Patent Application No. 2003-582713, dated Apr. 1, 2008 (Translation only).

Examination Report from European Application No. 02807188, dated Jul. 13, 2010.

Examination Report from Australian Patent Office for Singapore Patent Application No. SG 200606414-1, dated May 25, 2010.

Second Written Opinion from Australian Patent Office for Singapore Patent Application No. SG 200606414-1, dated Sep. 18, 2009.

EP Office Communication from Application No. 02 807 188.4-2218 dated Jul. 13, 2010.

AU Examination Report from Application No. SG200606414-1 faxed to us on Jul. 16, 2010.

\* cited by examiner

Fig. 6A

```
1    <depot>
2        <description type = "string"
3               value = "Apply Diffuse Texture and Glossy Reflection" />
4        <equation type = "string"
5               value = "object/diffuseTexture" />
6        <categories>
7            <Shiny type = "string"
8                   value = "Plain" />
9        </categories>
10       <settings>
11           <shininess type = "float"
12                  value = "0.800000" />
13       </settings>
14       <tweakables>
15           <shininess>
16               <description type = "string"
17                      value = "Object Shininess" />
18               <element type = "float"
19                      link = "sfx/[self]/settings/shininess" />
20               <gui type = "string"
21                      value = "slider" />
22               <min type = "float"
23                      value = "0.000000" />
24               <max type = "float"
25                      value = "1.000000" />
26               <step type = "float"
27                      value = "0.100000" />
28           </shininess>
29       </tweakables>
30       <imps>
31           <dx8>
32               <impl>
33                   <priority type = "float"
34                          value = "1.000000" />
35                   <description type = "string"
36                          value = "Shiny with Gloss Alpha Channel" />
37                   <requirements>
38                       <os type = "bool"
39                              function = "GreaterEqual_float( parameters/os/version, float( 5.0 ) )" />
40                       <api type = "bool"
41                              function = "GreaterEqual_float( parameters/api/version, float( 8.0 ) )" />
42                       <CubeTextureSupport type = "bool"
43                              function = "AllSet( D3DCAPS8/TextureCaps, bitset( D3DPTEXTURECAPS_CUBEMAP ) )" />
44                       <TextureSupport type = "bool"
45                              function = "GreaterEqual_uint( D3DCAPS8/MaxSimultaneousTextures, uint( 2 ) )" />
46                       <VertexShaders type = "bool"
47                              function = "GreaterEqual_float( D3DCAPS8/VertexShaderVersion, float( 1.1 ) )" />
48                       <PixelShaders type = "bool"
49                              function = "GreaterEqual_float( D3DCAPS8/PixelShaderVersion, float( 1.1 ) )" />
50                   </requirements>
51                   <passes>
52                       <passCount type = "uint"
53                              value = "1" />
54                       <pass0>
55                           <renderstates>
56                               <D3DRS_CULLMODE type = "D3DCULL"
57                                      value = "D3DCULL_NONE" />
58                           </renderstates>
59                           <vertexshader>
60                               <shader type = "string"
61                                      value = "vs.1.1
62                                          mov oT0, v7
63                                          mul r0,   v0.x, c10
64                                          mad r0,   v0.y, c11, r0
```

Fig. 6B

```
65                    mad r0,    v0.z, c12, r0
66                    mad oPos,  v0.w, c13, r0

67                    mul r0.xyz, v3.x, c4
68                    mad r0.xyz, v3.y, c5, r0
69                    mad r0.xyz, v3.z, c6, r0

70                    dp3 r0.w, r0.xyz, r0.xyz
71                    rsq r0.w, r0.w
72                    mul r0,   r0, r0.w
73                    sge r0.w, r0.w, r0.w 74                    mul r1, v0.z, c4
75                    mad r1, v0.y, c5, r1
76                    mad r1, v0.z, c6, r1
77                    mad r1, v0.w, c7, r1

78                    dp3 r1.w, r1.xyz, r1.xyz
79                    rsq r1.w, r1.w
80                    mul r1,   r1, r1.w
81                    sge r1.w, r1.w, r1.w 82                    dp3 r2, r0, r1
83                    add r2, r2, r2
84                    mul r4.xyz, r1, r2
85                    add oT1.xyz, r0, r4
86                    sge oT1.w, r0.w, r0.w 87                    mov oD0, v5
88                    mov oD1, v5 " />

89           <handle type = "uint"
90                    function = "compile_dx8_vs( ../shader )" />

91           <equation type = "string"
92                    value = "dp3 R_DOT2, R_EYE_VECTOR, R_EYE_NORMAL
93                            add R_DOT2, R_DOT2, R_DOT2
94                            mul R_EYE_NORMAL, R_EYE_NORMAL, R_DOT2
95                            add oT3, R_EYE_VECTOR, -R_EYE_NORMAL
96                            mov oT3.w, c[Cv_ONE].x " />

97           <mapping>

98               <v6 type = "string"
99                    value = "position" />

100              <v3 type = "string"
101                   value = "normal" />

102              <v5 type = "string"
103                   value = "diffuse" />

104              <v7 type = "string"
105                   value = "tex0" />

106          </mapping>

107          <constants>

108              <c20 type = "vector4"
109                   value = "0.500000 0.500000 0.500000 0.000000" />

110              <c10 type = "matrix4"
111                   link = "parameters/transforms/mvp" />

112              <c4 type = "matrix4"
113                   function = "PostMul( parameters/transforms/world, parameters/transforms/view }" />

114          </constants>

115     </vertexshader>
116     <pixelshader>

117          <smooth_shader type = "string"
118                   value = "ps.1.1
119                            tex t0
120                            tex t1
121                            tex t2

122                            sub r0, t0, t1
123                            dp3 r0, r0, c0

124                            sub r1, t2, t1
125                            dp3 r1, r1, r1

126                            sub t0.a, r0.a, r1.a 127                            add_sat r0.a, t0.a, c0.a 128                            cnd r0, r0.a, t0, t2

129                            lrp r0.rgb, t1.a, t1, r0
130                            + mov r0.a, t1.a " />

131          <shader type = "string"
132                   value = "ps.1.1

133                            tex t0
134                            tex t1
135                            mul_x2_sat r1, 1-t0.a, c0.a
136                            mad_sat r0, c1, t1, t0" />

137          <DVC_shader type = "string"
138                   value = "ps.1.1
139                            tex t0

140                            dp3_sat r0, t0, c0
```

Fig. 6C

```
141                            sub_sat r1, t0, r0
142                            mad_sat r0, c1.a, r1, t0 " />
143              <handle type = "uint"
144                      function = "compile_dx8_ps( ../shader )" />
145              <constants>
146                  <c0 type = "vector4"
147                      function = "Construct_vector4_floats( float( 0.11 ),
148                                                           float( 0.20 ),
149                                                           float( 0.59 ),
150                                                           sfx/[self]/settings/shininess )" />
151                  <c1 type = "vector4"
152                      function = "Construct_vector4_floats( float( 0.5 ),
153                                                           float( 0.5 ),
154                                                           float( 0.5 ),
155                                                           float( 0.8 ) ) " />
156              </constants>
157          </pixelshader>
158          <texturestages>
159              <stage0>
160                  <D3DTSS_MINFILTER type = "D3DTEXTUREFILTERTYPE"
161                      value = "D3DTEXF_LINEAR" />
162                  <D3DTSS_MIPFILTER type = "D3DTEXTUREFILTERTYPE"
163                      value = "D3DTEXF_LINEAR" />
164                  <D3DTSS_MAGFILTER type = "D3DTEXTUREFILTERTYPE"
165                      value = "D3DTEXF_LINEAR" />
166              </stage0>
167              <stage1>
168                  <D3DTSS_MINFILTER type = "D3DTEXTUREFILTERTYPE"
169                      value = "D3DTEXF_LINEAR" />
170                  <D3DTSS_MIPFILTER type = "D3DTEXTUREFILTERTYPE"
171                      value = "D3DTEXF_LINEAR" />
172                  <D3DTSS_MAGFILTER type = "D3DTEXTUREFILTERTYPE"
173                      value = "D3DTEXF_LINEAR" />
174              </stage1>
175          </texturestages>
176          <textures>
177              <t0 type = "uint"
178                  link = "parameters/object/texture/diffuse/_2D/R8G8B8A8/handle" />
179              <t1 type = "uint"
180                  link = "parameters/object/texture/normal/_2D/R8G8B8A8/handle" />
181          </textures>
182        </pass0>
183      </passes>
184    </impl>
185    <impl2>
186      <priority type = "float"
187          value = "0.500000" />
188      <description type = "string"
189          value = "Shiny with Gloss Alpha Channel Fixed Function" />
190      <requirements>
191          <os type = "bool"
192              function = "GreaterEqual_float( parameters/os/version, float( 5.0 ) )" />
193          <CubeTextureSupport type = "bool"
194              function = "AllSet( D3DCAPS8/TextureCaps, bitset( D3DPTEXTURECAPS_CUBEMAP ) )" />
195          <api type = "bool"
196              function = "GreaterEqual_float( parameters/api/version, float( 8.0 ) )" />
197          <TextureSupport type = "bool"
198              function = "GreaterEqual_uint( D3DCAPS8/MaxSimultaneousTextures, uint( 2 ) )" />
199      </requirements>
200      <passes>
201          <passCount type = "uint"
202              value = "1" />
203          <pass0>
204              <renderstates>
205                  <D3DRS_CULLMODE type = "D3DCULL"
206                      value = "D3DCULL_NONE" />
207                  <D3DRS_TEXTUREFACTOR type = "uint"
208                      function = "vector4_to_d3dcolor( Construct_vector4_floats( float( 0.0 ),
```

Fig. 6D

```
209                              float( 0.0 ),
210                              float( 0.0 ),
211                              odx/[self]/settings/shininess ) )" />
212            </renderstates>
213            <transforms>
214                <D3DTS_WORLD type = "matrix4"
215                        link = "parameters/transforms/world" />
216                <D3DTS_VIEW type = "matrix4"
217                        link = "parameters/transforms/view" />
218                <D3DTS_PROJECTION type = "matrix4"
219                        link = "parameters/transforms/projection" />
220                <D3DTS_TEXTURE1 type = "matrix4"
221                        function = "Transpose( parameters/transforms/world )" />
222            </transforms>
223            <vertexshader>
224                <handle type = "uint"
225                        link = "parameters/object/vertex/FVF" />
226            </vertexshader>
227            <texturestages>
228                <stage0>
229                    <D3DTSS_MINFILTER type = "D3DTEXTUREFILTERTYPE"
230                            value = "D3DTEXF_LINEAR" />
231                    <D3DTSS_MIPFILTER type = "D3DTEXTUREFILTERTYPE"
232                            value = "D3DTEXF_LINEAR" />
233                    <D3DTSS_MAGFILTER type = "D3DTEXTUREFILTERTYPE"
234                            value = "D3DTEXF_LINEAR" />
235                    <D3DTSS_COLORARG1 type = "D3DTA"
236                            value = "D3DTA_TEXTURE" />
237                    <D3DTSS_COLOROP type = "D3DTEXTUREOP"
238                            value = "D3DTOP_SELECTARG1" />
239                    <D3DTSS_ALPHAARG1 type = "D3DTA"
240                            value = "D3DTA_TEXTURE | D3DTA_COMPLEMENT" />
241                    <D3DTSS_ALPHAOP type = "D3DTEXTUREOP"
242                            value = "D3DTOP_MODULATE2X" />
243                    <D3DTSS_ALPHAARG2 type = "D3DTA"
244                            value = "D3DTA_TFACTOR" />
245                </stage0>
246                <stage1>
247                    <D3DTSS_TEXCOORDINDEX type = "D3DTSS_TCI"
248                            value = "D3DTSS_TCI_CAMERASPACEREFLECTIONVECTOR | 1" />
249                    <D3DTSS_TEXTURETRANSFORMFLAGS type = "D3DTEXTURETRANSFORMFLAGS"
250                            value = "D3DTTFF_COUNT3" />
251                    <D3DTSS_MINFILTER type = "D3DTEXTUREFILTERTYPE"
252                            value = "D3DTEXF_LINEAR" />
253                    <D3DTSS_MIPFILTER type = "D3DTEXTUREFILTERTYPE"
254                            value = "D3DTEXF_LINEAR" />
255                    <D3DTSS_MAGFILTER type = "D3DTEXTUREFILTERTYPE"
256                            value = "D3DTEXF_LINEAR" />
257                    <D3DTSS_COLORARG0 type = "D3DTA"
258                            value = "D3DTA_CURRENT" />
259                    <D3DTSS_COLORARG1 type = "D3DTA"
260                            value = "D3DTA_TEXTURE" />
261                    <D3DTSS_COLORARG2 type = "D3DTA"
262                            value = "D3DTA_CURRENT | D3DTA_ALPHAREPLICATE" />
263                    <D3DTSS_COLOROP type = "D3DTEXTUREOP"
264                            value = "D3DTOP_MULTIPLYADD" />
265                    <D3DTSS_ALPHAOP type = "D3DTEXTUREOP"
266                            value = "D3DTOP_SELECTARG1" />
267                    <D3DTSS_ALPHAARG1 type = "D3DTA"
268                            value = "D3DTA_CURRENT" />
269                </stage1>
270            </texturestages>
271            <pixelshader>
272            </pixelshader>
273            <textures>
274                <t0 type = "uint"
275                        link = "parameters/object/texture/diffuse/_2D/R8G8B8A8/handle" />
276                <t1 type = "uint"
277                        link = "parameters/locale/texture/environment/cube/R8G8B8A8/handle" />
```

Fig. 6E

```
278                </textures>
279            </pass0>
280         </passes>
281     </imp2>
282     <imp3>
283         <priority type = "float"
284              value = "0.600000" />
285         <description type = "string"
286              value = "Shiny with Gloss Alpha Channel Fixed Function" />
287         <requirements>
288             <os type = "bool"
289                  function = "GreaterEqual_float( parameters/os/version, float( 5.0 ) )" />
290             <CubeTextureSupport type = "bool"
291                  function = "AllSet( D3DCAPS8/TextureCaps, bitset( D3DPTEXTURECAPS_CUBEMAP ) )" />
292             <api type = "bool"
293                  function = "GreaterEqual_float( parameters/api/version, float( 8.0 ) )" />
294             <TextureSupport type = "bool"
295                  function = "GreaterEqual_uint( D3DCAPS8/MaxSimultaneousTextures, uint( 2 ) )" />
296         </requirements>
297         <passes>
298             <passCount type = "uint"
299                  value = "1" />
300             <pass0>
301                 <renderstates>
302                     <D3DRS_CULLMODE type = "D3DCULL"
303                          value = "D3DCULL_NONE" />
304                     <D3DRS_TEXTUREFACTOR type = "uint"
305                          function = "vector4_to_d3dcolor( Construct_vector4_floats( float( 0.0 ),
306                                                           float( 0.0 ),
307                                                           float( 0.0 ),
308                                                           sfx/[self]/settings/shininess ) )" />
309                 </renderstates>
310                 <transforms>
311                     <D3DTS_WORLD type = "matrix4"
312                          link = "parameters/transforms/world" />
313                     <D3DTS_VIEW type = "matrix4"
314                          link = "parameters/transforms/view" />
315                     <D3DTS_PROJECTION type = "matrix4"
316                          link = "parameters/transforms/projection" />
317                     <D3DTS_TEXTURE1 type = "matrix4"
318                          function = "Transpose( parameters/transforms/world )" />
319                 </transforms>
320                 <vertexshader>
321                     <handle type = "uint"
322                          link = "parameters/object/vertex/FVF" />
323                 </vertexshader>
324                 <texturestages>
325                     <stage0>
326                         <D3DTSS_MINFILTER type = "D3DTEXTUREFILTERTYPE"
327                              value = "D3DTEXF_LINEAR" />
328                         <D3DTSS_MIPFILTER type = "D3DTEXTUREFILTERTYPE"
329                              value = "D3DTEXF_LINEAR" />
330                         <D3DTSS_MAGFILTER type = "D3DTEXTUREFILTERTYPE"
331                              value = "D3DTEXF_LINEAR" />
332                         <D3DTSS_COLORARG1 type = "D3DTA"
333                              value = "D3DTA_TEXTURE" />
334                         <D3DTSS_COLOROP type = "D3DTEXTUREOP"
335                              value = "D3DTOP_SELECTARG1" />
336                         <D3DTSS_ALPHAARG1 type = "D3DTA"
337                              value = "D3DTA_TFACTOR" />
338                         <D3DTSS_ALPHAOP type = "D3DTEXTUREOP"
339                              value = "D3DTOP_MODULATE2X" />
340                         <D3DTSS_ALPHAARG2 type = "D3DTA"
341                              value = "D3DTA_TEXTURE" />
342                     </stage0>
343                     <stage1>
344                         <D3DTSS_TEXCOORDINDEX type = "D3DTSS_TCI"
345                              value = "D3DTSS_TCI_CAMERASPACEREFLECTIONVECTOR | 1" />
```

Fig. 6F

```
346                    <D3DTSS_TEXTURETRANSFORMFLAGS type = "D3DTEXTURETRANSFORMFLAGS"
347                            value = "D3DTTFF_COUNT2" />
348                    <D3DTSS_MINFILTER type = "D3DTEXTUREFILTERTYPE"
349                            value = "D3DTEXF_LINEAR" />
350                    <D3DTSS_MIPFILTER type = "D3DTEXTUREFILTERTYPE"
351                            value = "D3DTEXF_LINEAR" />
352                    <D3DTSS_MAGFILTER type = "D3DTEXTUREFILTERTYPE"
353                            value = "D3DTEXF_LINEAR" />
354                    <D3DTSS_COLORARG0 type = "D3DTA"
355                            value = "D3DTA_CURRENT" />
356                    <D3DTSS_COLOROP type = "D3DTEXTUREOP"
357                            value = "D3DTOP_MODULATEALPHA_ADDCOLOR" />
358                    <D3DTSS_COLORARG1 type = "D3DTA"
359                            value = "D3DTA_TEXTURE" />
360                    <D3DTSS_ALPHAARG1 type = "D3DTA"
361                            value = "D3DTA_TEXTURE" />
362                    <D3DTSS_ALPHAOP type = "D3DTEXTUREOP"
363                            value = "D3DTOP_SELECTARG1" />
364                </stage1>
365            </texturestages>
366            <pixelshader>
367            </pixelshader>
368            <textures>
369                <t0 type = "uint"
370                    link = "parameters/object/texture/diffuse/_2D/R8G8B8A8/handle" />
371                <t1 type = "uint"
372                    link = "parameters/locale/texture/environment/cube/R8G8B8A8/handle" />
373            </textures>
374        </pass0>
375        </passes>
376    </mp3>
377    </dx8>
378    <ogl>
379        <impl>
380            <element name = "priority"
381                type = "float"
382                value = "1.000000" />
383            <element name = "description"
384                type = "string"
385                value = "Shiny with Gloss Alpha Channel" />
386            <requirements>
387                <element name = "os"
388                    type = "bool"
389                    function = "GreaterEqual_float( parameters/os/version, float( 5.0 ) )" />
390                <element name = "api"
391                    type = "bool"
392                    function = "GreaterEqual_float( parameters/api/version, float( 1.0 ) )" />
393                <element name = "registerCombinerSupport"
394                    type = "bool"
395                    function = "RequiredNumRegisterCombiners(uint(2))" />
396                <extensions>
397                    <element name = "GL_NV_vertex_program"
398                        type = "bool"
399                        function = "InitExtension(string(GL_NV_vertex_program))" />
400                    <element name = "GL_NV_register_combiners"
401                        type = "bool"
402                        function = "InitExtension(string(GL_NV_register_combiners))" />
403                    <element name = "GL_ARB_texture_compression"
404                        type = "bool"
405                        function = "InitExtension(string(GL_ARB_texture_compression))" />
406                    <element name = "GL_EXT_texture_compression_s3tc"
407                        type = "bool"
408                        function = "InitExtension(string(GL_EXT_texture_compression_s3tc))" />
409                </extensions>
410            </requirements>
411            <textureHandles>
412                <handle0>
413                    <element name = "name"
414                        type = "string"
415                        value = "decaltex" />
416                    <element name = "handle"
417                        type = "GLuint"
```

Fig. 6G

```
418                              function = "sfx_glGenTexture()" />
419                       <element name = "data"
420                              type = "sfxTexData"
421                              function =
422                                  "LoadTextureDataFromFile(string(stonesarchaic.tga),string(rgb))" />
423                       <element name = "mipmap"
424                              type = "bool"
425                              value = "true" />
426                       <element name = "target"
427                              type = "sfx_GLenum"
428                              value = "GL_TEXTURE_2D" />
429                       <element name = "internalFormat"
430                              type = "sfx_GLenum"
431                              value = "GL_RGB8" />
432                       <element name = "externalFormat"
433                              type = "sfx_GLenum"
434                              value = "GL_RGB" />
435                       <element name = "dataType"
436                              type = "sfx_GLenum"
437                              value = "GL_UNSIGNED_BYTE" />
438                   </handle0>
439                   <handle1>
440                       <element name = "name"
441                              type = "string"
442                              value = "envmap" />
443                       <element name = "data"
444                              type = "sfxTexData"
445                              function =
446                                  "LoadTextureDataFromFile(string(sky_cube_mipmap.dds),string(null))" />
447                       <element name = "mipmap"
448                              type = "bool"
449                              value = "true" />
450                       <element name = "target"
451                              type = "sfx_GLenum"
452                              value = "GL_TEXTURE_CUBE_MAP_EXT" />
453                       <element name = "GL_TEXTURE_WRAP_S"
454                              type = "sfx_GLenum"
455                              value = "GL_CLAMP_TO_EDGE" />
456                       <element name = "GL_TEXTURE_WRAP_T"
457                              type = "sfx_GLenum"
458                              value = "GL_CLAMP_TO_EDGE" />
459                       <element name = "GL_TEXTURE_WRAP_R"
460                              type = "sfx_GLenum"
461                              value = "GL_CLAMP_TO_EDGE" />
462                       <element name = "GL_TEXTURE_MIN_FILTER"
463                              type = "sfx_GLenum"
464                              value = "GL_LINEAR" />
465                       <element name = "GL_TEXTURE_MAG_FILTER"
466                              type = "sfx_GLenum"
467                              value = "GL_LINEAR" />
468                   </handle1>
469               </textureHandles>
470               <passes>
471                   <element name = "passCount"
472                          type = "uint"
473                          value = "1" />
474                   <pass0>
475                       <transforms>
476                           <model type = "matrix4"
477                                  link = "parameters/transforms/world" />
478                           <view type = "matrix4"
479                                  link = "parameters/transforms/view" />
480                           <projection type = "matrix4"
481                                  link = "parameters/transforms/projection" />
482                       </transforms>
483                       <vertexshader>
484                           <mapping>
485                               <element name = "v[OPOS]"
486                                      type = "string"
487                                      value = "position" />
488                               <element name = "v[NRML]"
489                                      type = "string"
490                                      value = "normal" />
491                               <element name = "v[COL0]"
492                                      type = "string"
493                                      value = "diffuse" />
494                               <element name = "v[TEX0]"
495                                      type = "string"
496                                      value = "tex0" />
```

Fig. 6H

```
497                </mapping>
498            <element name = "shader"
499                type = "string"
500                value = ":!VP1.0
501                        MOV    o[TEX0], v[TEX0];
502                        DP4    o[HPOS].x, c[0], v[OPOS];
503                        DP4    o[HPOS].y, c[1], v[OPOS];
504                        DP4    o[HPOS].z, c[2], v[OPOS];
505                        DP4    o[HPOS].w, c[3], v[OPOS];

506                        DP4    R0.x, c[8], v[NRML];
507                        DP4    R0.y, c[9], v[NRML];
508                        DP4    R0.z, c[10], v[NRML];
509                        DP3    R0.w, R0, R0;
510                        RSQ    R0.w, R0.w;
511                        MUL    R0, R0, R0.w;
512                        SGE    R0.w, R0.w, R0.w;

513                        DP4    R1.x, c[4], v[OPOS];
514                        DP4    R1.y, c[5], v[OPOS];
515                        DP4    R1.z, c[6], v[OPOS];
516                        DP4    R1.w, c[7], v[OPOS];
517                        DP3    R1.w, R1, R1;
518                        RSQ    R1.w, R1.w;
519                        MUL    R1, R1, R1.w;
520                        SGE    R1.w, R1.w, R1.w;

521                        DP3    R2, R0, R1;
522                        ADD    R2, R2, R2;
523                        MUL    R4.xyz, R1, R2;
524                        ADD    o[TEX1].xyz, R0, -R4;
525                        SGE    o[TEX1].w, R0.w, R0.w;
526                        MOV    o[COL0], v[COL0];
527                        MOV    o[COL1], v[COL1];
528                        END" />
529            <element name = "handle"
530                type = "ogl_vs_handle"
531                function = "compile_ogl_vs_handle( ../shader )" />

532            <constants>
533                <element name = "c0"
534                    type = "nvTrackMatrixParams"
535                    value = "GL_MODELVIEW_PROJECTION_NV GL_IDENTITY_NV" />

536                <element name = "c4"
537                    type = "nvTrackMatrixParams"
538                    value = "GL_MODELVIEW GL_IDENTITY_NV" />

539                <element name = "c8"
540                    type = "nvTrackMatrixParams"
541                    value = "GL_MODELVIEW GL_INVERSE_TRANSPOSE_NV" />

542            </constants>

543        </vertexshader>

544        <textures>

545            <unit0>
546                <element name = "handle"
547                    type = "string"
548                    link = "sfx/[self]/imps/ogl/impl/textureHandles/handle0/name" />
549            </unit0>

550            <unit1>
551                element name = "handle"
552                    type = "string"
553                    link = "sfx/[self]/imps/ogl/impl/textureHandles/handle1/name" />
554            </unit1>
555        </textures>

556        <registercombiners>
557            <constants>

558                <element name = "const0"
559                    type = "vector4"
560                    function = "Construct_vector4_floats( float( 0.0 ),
561                                                          float( 0.0 ),
562                                                          float( 0.0 ),
563                                                          sfx/[self]/settings/shininess )" />
564            </constants>

565            <element name = "nvparseInlineRegisterCombiner"
566                type = "string"
567                value = "!!RC1.0
568                        {
569                            rgb {
570                                spare0 = unsigned_invert(tex0.a) * const0.a;
571                                scale_by_two();
572                            }
573                        }
574                        {
575                            rgb {
576                                discard = unsigned(spare0)*tex1;
577                                discard = tex0;
578                                spare0 = sum();
579                            }
580                        }
581                        out.rgb = spare0; " />
582            <element name = "handle"
583                type = "ogl_rc_handle"
584                function = "compile_ogl_rc_handle( ../nvparseInlineRegisterCombiner )" />

585        </registercombiners>

586    </pass0>
```

Fig. 6I

```
587             </passes>
588           </impl>
589         </ogl>
590     </imps>
591  </depot>
```

SHADER PROGRAM GENERATION SYSTEM AND METHOD

RELATED APPLICATION

The present application is a continuation of an application filed Mar. 20, 2002 under application Ser. No. 10/102,989, which is incorporated herein by reference in its entirety.

FIELD OF THE INVENTION

The present invention relates to computer graphics, and more particularly to shading operations within a graphics pipeline.

BACKGROUND OF THE INVENTION

Rendering and displaying 3-D graphics typically involves many calculations and computations. For example, to render a 3-D object, a set of coordinate points or vertices that define the object to be rendered must be formed. Vertices can be joined to form polygons that define the surface of the object to be rendered and displayed. Once the vertices that define an object are formed, the vertices must be transformed from an object or model frame of reference to a world frame of reference and finally to 2-D coordinates that can be displayed on a flat display device, such as a monitor. Along the way, vertices may be rotated, scaled, eliminated or clipped because they fall outside of a viewable area, lit by various lighting schemes and sources, colorized, and so forth. The processes involved in rendering and displaying a 3-D object can be computationally intensive and may involve a large number of vertices.

To create a 3-D computer graphical representation, the first step is to represent the objects to be depicted as mathematical models within the computer. 3-D models are made up of geometric points within a coordinate system consisting of an x, y and z axis; these axes correspond to width, height, and depth respectively. Objects are defined by a series of points, called vertices. The location of a point, or vertex, is defined by its x, y and z coordinates. When three or more of these points are connected, a polygon is formed. The simplest polygon is a triangle.

3-D shapes are created by connecting a number of 2-D polygons. Curved surfaces are represented by connecting many small polygons. The view of a 3-D shape composed of polygon outlines is called a wire frame view. In sum, the computer creates 3-D objects by connecting a number of 2-D polygons. Before the 3-D object is ultimately rendered on a 2-D display screen, however, the data of sophisticated graphics objects undergoes many different mathematical transformations that implicate considerably specialized equations and processing unique to 3-D representation.

For a long time now, 3-D rendering systems have been able to describe the "appearance" of objects according to parameters. These and later methods provide for the parameterization of the perceived color of an object based on the position and orientation of its surface and the light sources illuminating it. In so doing, the appearance of the object is calculated therefrom. Parameters further include values such as diffuse color, the specular reflection coefficient, the specular color, the reflectivity, and the transparency of the material of the object. Such parameters are globally referred to as the shading parameters of the object.

Early systems could only ascribe a single value to shading parameters and hence they remained constant and uniform across the entire surface of the object. Later systems allowed for the use of non-uniform parameters (transparency for instance) which might have different values over different parts of the object. Two prominent and distinct techniques have been used to describe the values taken by these non-uniform parameters on the various parts of the object's surface: procedural shading and texture mapping. Texture mapping is pixel based and resolution dependent.

Procedural shading describes the appearance of a material at any point of a 1-D, 2-D or 3-D space by defining a function (often called the procedural shader) in this space into shading parameter space. The object is "immersed" in the original 1-D, 2-D or 3-D space and the values of the shading parameters at a given point of the surface of the object are defined as a result of the procedural shading function at this point. For instance, procedural shaders that approximate appearance of wood, marble or other natural materials have been developed and can be found in the literature.

The rendering of graphics data in a computer system is a collection of resource intensive processes. The process of shading i.e., the process of performing complex techniques upon set(s) of specialized graphics data structures, used to determine values for certain primitives, such as color, etc. associated with the graphics data structures, exemplifies such a computation intensive and complex process. For each application developer to design these shading techniques for each program developed and/or to design each program for potentially varying third party graphics hardware would be a Herculean task, and would produce much inconsistency.

Consequently, generally the process of shading has been normalized to some degree. By passing source code designed to work with a shader into an application, a shader becomes an object that the application may create/utilize in order to facilitate the efficient drawing of complex video graphics. Vertex shaders and pixel shaders are examples of such shaders.

Prior to their current implementation in specialized hardware chips, vertex and pixel shaders were sometimes implemented wholly or mostly as software code, and sometimes implemented as a combination of more rigid pieces of hardware with software for controlling the hardware. These implementations frequently contained a CPU or emulated the existence of one using the system's CPU. For example, the hardware implementations directly integrated a CPU chip into their design to perform the processing functionality required of shading tasks. While a CPU adds a lot of flexibility to the shading process because of the range of functionality that a standard processing chip offers, the incorporation of a CPU adds overhead to the specialized shading process. Without today's hardware state of the art, however, there was little choice.

Today, though, existing advances in hardware technology have facilitated the ability to move functionality previously implemented in software into specialized hardware. As a result, today's pixel and vertex shaders are implemented as specialized and programmable hardware chips.

Unfortunately, programming such new vertex and pixel engines necessitates a meld of art and code resources never before required. Several digital content creation (DCC) applications have done an admirable job of supporting vertex and pixel shaders as far as they go, but it is not obvious how to allow artists to play with various shading options without having them become full-fledged shader programmers.

SUMMARY

A method and computer program product are provided for generating a shader program. Initially, a file associated with a graphics effect is a selected. Such file is then read and processed. A shader program is subsequently generated based on the processing of the file to apply the graphics effect to an object. Thus, a shader program may be correctly applied to an object for display or other purposes.

In one embodiment, the file may be selected from a library of files each associated with a unique graphics effect. Further, the file may include interface data capable of being processed to generate the shader program for different graphics application program interfaces. In a similar manner, the file may include implementation data capable of being processed to generate the shader program for different hardware graphics pipeline platforms. Thus, the file may be processed in a way to generate shader programs for working in conjunction with various different graphics application program interfaces (i.e. OpenGL®, Direct 3D™, etc.), and a variety of platforms (i.e. hardware graphics chips manufactured by different companies).

In another embodiment, the file may be written in an extensible markup language (XML). Moreover, the file may include a text file. Still yet, the selecting, reading, processing, and generating may be carried out utilizing an interface [i.e. Component Object Model (COM)], plug-in, etc.

As an option, the file may take the form of a data structure having a textual descriptive object for identifying a graphics effect associated with the file. Further provided may be a requirements object for identifying requirements necessary to generate the shader program.

Thus, the file may include requirements, with the shader program being generated based on the requirements. In general, the requirements may include a default set of requirements, which may be optionally custom tailored. Optionally, the requirements may include a call back function.

The file may further include a plurality of shader code segments capable of executing the graphics effect in a plurality of operating environments (i.e. platform implementation, interface, etc.). Such shader code segments may be organized in terms of the different operating environments. Thus, the present embodiment may optionally be used as a reference for obtaining desired shader code segments.

During operation of one particular embodiment, the processing may include initializing an interface. Such processing may further include registering custom types and/or custom functions. Thus, the shader program may be generated based on the registered custom types and/or custom functions. By this feature, the present embodiment allows a user to customize the resulting shader program.

Still yet, the processing may include setting up a plurality of objects, selecting one of the objects, selecting one of a plurality of graphics effects, selecting a render pass, setting up the render pass, and drawing the object with the selected graphics effect. As an option, the render pass may be set up by pointing to parameters so that the shader program may be generated based on the parameters. Further, the object may be drawn with the selected graphics effect utilizing attributes supplied by an application.

During a rendering pass, it may be determined whether more render passes exist, and another render pass selected if more render passes exist. Further, it may be determined whether more objects exist, and another object selected if more objects exist. Still yet, it may be determined whether more graphics effects exist, and another graphics effect selected if more graphics effects exist.

One exemplary system that may be used to carry the foregoing functionality may include an interface and an application program for working in conjunction to process a file. Thus, the shader program is generated based on the processing of the file to apply the graphics effect to the object.

As mentioned earlier, the processing includes setting up a plurality of objects. From the perspective of the application in the context of the present system embodiment, this may be accomplished by selecting a file associated with a graphics effect, selecting a graphics application program interface, and receiving implementation data representing a plurality of different hardware graphics pipeline platforms based on the selection. Next, parameters are received based on the implementation data. Further, it may be decided which of the hardware graphics pipeline platforms to use based at least in part on the parameters. By this design, the shader program is generated for use with the appropriate hardware graphics pipeline platform.

As an option, the decision as to which of the hardware graphics pipeline platforms is to be used may be based on whether the parameters are capable of being supplied. Still yet, the decision as to which of the hardware graphics pipeline platforms may be used is based on whether the parameters are understood (i.e., able to be correctly interpreted) by the application. Once such decisions have been made, attributes of an object are mapped to the parameters.

From the perspective of the interface in the context of the present system embodiment, the objects are set up by generating implementation data representing a plurality of different hardware graphics pipeline platforms. Parameters are then generated based on the implementation data. Still yet, the interface works in conjunction with the application to decide as to which of the hardware graphics pipeline platforms to use based on the parameters.

Optionally, the implementation data may be generated by determining whether the different hardware graphics pipeline platforms meet a plurality of requirements. Moreover, the implementation data may be further generated by sorting the different hardware graphics pipeline platforms that meet the requirements.

Associated with the foregoing framework is a computer-implemented method for generating a license agreement. Initially, a license agreement stored in memory is identified. Next, files associated with the license agreement are identified. It is then determined as to whether one or more files are not distributable. If it is determined that one or more files are not distributable, a non-disclosure term is included in the license agreement.

Another computer implemented method is provided for determining whether a file is distributable. Such method may include identifying a file stored in memory, determining whether the file is distributable, and simply indicating whether the file is distributable.

In order to allow a user to visually experiment and use the shader program, an optional graphical user interface is provided. In use, the aforementioned graphics effect may be displayed utilizing such graphical user interface. Further, the graphics effect may be capable of being altered by a user utilizing the graphical user interface. In particular, the graphics effect may be capable of being altered by altering parameters, and the shader program may be generated based on the altered parameters. Such parameters may altered by tweaking the aforementioned file.

Another graphical user interface may also be provided in which a plurality of graphics effects are displayed for allowing a user to select one graphics effect. Such selected graphics effect is then displayed as applied to an object using a file. Further, the file is modified based on user input and the file is processed. Thus, the shader program may be generated based on the processing of the file.

As a further option, the interface may be capable of generating primitives. Further, the file may include a syntax including a name, a type and a content. Still yet, the file may be capable of referencing both compiled and un-compiled code.

These and other advantages of the present invention will become apparent upon reading the following detailed description and studying the various figures of the drawings.

BRIEF DESCRIPTION OF THE DRAWINGS

The foregoing and other aspects and advantages are better understood from the following detailed description of a preferred embodiment of the invention with reference to the drawings, in which:

FIGS. 1A-1 illustrates a more detailed diagram showing the internal structure of one exemplary embodiment of the hardware graphics pipeline of FIG. 1A.

FIG. 1A-2 illustrates an exemplary file that may be used to generate a shader program, in accordance with one embodiment.

FIG. 2 illustrates an "effect binding" method by which objects are set up in accordance with operation 1080 of FIGS. 1B and 1C.

FIGS. 6A-6I illustrate an example of the file 160 of FIGS. 1A-2, in accordance with one embodiment.

DESCRIPTION OF THE PREFERRED EMBODIMENTS

Figure 1A:
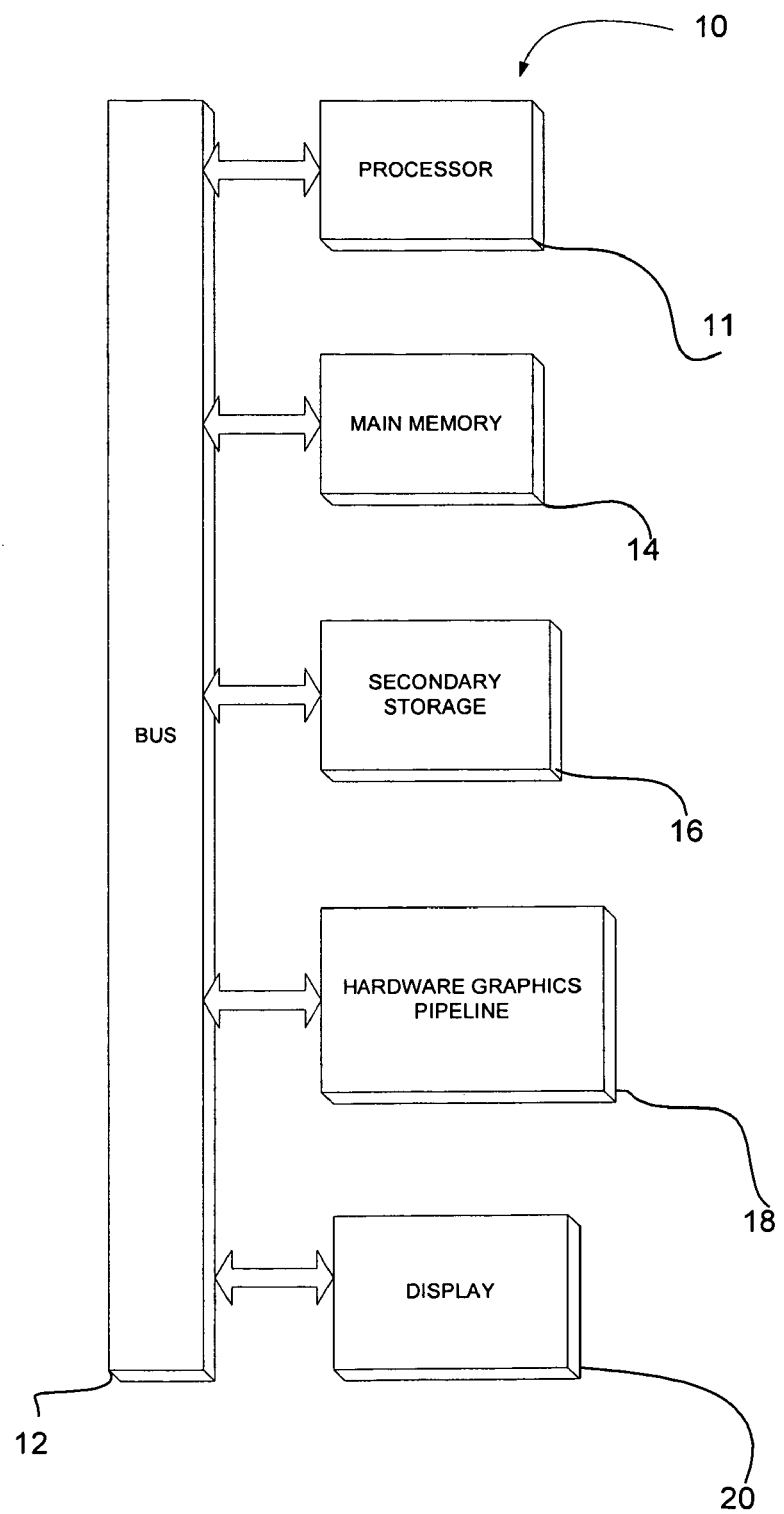
FIG. 1A is a block diagram of a digital processing system, in accordance with one embodiment.

FIG. 1A is a block diagram of a digital processing system, in accordance with one embodiment. With reference to FIG. 1A, a computer graphics system is provided that may be implemented using a computer 10. The computer 10 includes one or more processors, such as processor 11, which is connected to a communication bus 12. The bus 12 can be implemented with one or more integrated circuits, and perform some logic functions; for example, a typical personal computer includes chips known as north bridge and south bridge chips. The computer 10 also includes a main memory 14. Control logic (software) and data are stored in the main memory 14 which may take the form of random access memory (RAM). The computer also includes a hardware graphics pipeline 18 and a display 20, i.e. a computer monitor.

The computer 10 may also include a secondary storage 16. The secondary storage 16 includes, for example, a hard disk drive and/or a removable storage drive, representing a floppy disk drive, a magnetic tape drive, a compact disk drive, etc. The removable storage drive reads from and/or writes to a removable storage unit in a well known manner. Computer programs, or computer control logic algorithms, are stored in the main memory 14 and/or the secondary storage 16. Such computer programs, when executed, enable the computer 10 to perform various functions. Memory 14 and storage 16 are thus examples of computer-readable media.

In one embodiment, the techniques to be set forth are performed by the hardware graphics pipeline 18 which may take the form of hardware. Such hardware implementation may include a microcontroller or any other type of custom or application specific integrated circuit (ASIC). In yet another embodiment, the method of the present invention may be carried out in part on the processor 11 by way of a computer program stored in the main memory 14 and/or the secondary storage 16 of the computer 10. One exemplary architecture for the hardware graphics pipeline 18 will be set forth during reference to FIGS. 1A-1.

Figures 1, 1A:
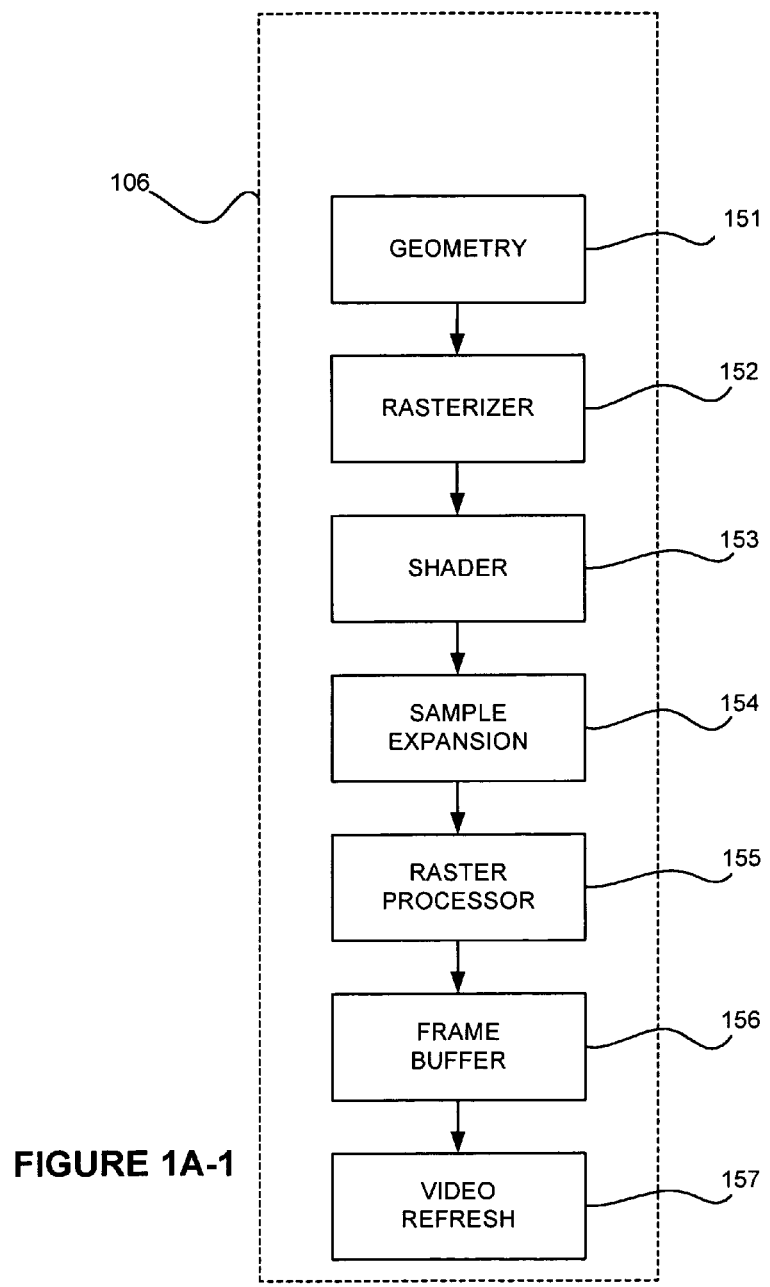

FIG. 1A-1 illustrates a more detailed diagram showing the internal structure of one exemplary embodiment of the hardware graphics pipeline 18 of FIG. 1A. As shown, a geometry stage 151 is provided which transforms primitives into a screen-aligned coordinate system. Other computations may be performed by the geometry stage 151 such as lighting to determine the visual properties (e.g., color, surface normal, texture coordinates) of each vertex describing the primitives.

The transformed vertices form the input for a rasterizer 152. The rasterizer 152 computes a fragment for each pixel covered by each of the primitives. A coverage mask stored with the fragment indicates which portions of the pixel the fragment covers.

Also included is a shader 153 that computes the final fragment, e.g. by applying texture maps or shader programs to the fragment. Such shader programs may be generated in various ways. One system and method for generating the shader programs will be set forth hereinafter in greater detail. It should be noted that in the context of the present description, shader programs may refer to vertex shader programs, pixel shader programs, or any other type of program capable of shading. An optional sample expansion stage 154 generates multiple samples for each fragment.

With continuing reference to FIGS. 1A-1, after multi-sampling, the individual samples are sent to a raster-processor (ROP) 155 as if they were regular fragments. The raster-processor 155 performs various operations on the fragments, including z/stencil testing and color or alpha blending. This may require the raster-processor 155 to read a frame buffer memory 156 in order to retrieve the destination Z or the destination color. To this end, the final pixel color and Z are written back to the frame buffer memory 156.

When all primitives in the scene have been rendered in this manner, the contents of the frame buffer memory 156 are scanned out by a video refresh unit 157 and sent to the display 20.

In one embodiment, all of the foregoing components of the graphics system 106 except the frame buffer memory 156 (and possibly other memories, such as texture memory) may be situated on a single semiconductor platform. Of course, the various modules may also be situated separately or in various combinations of semiconductor platforms per the desires of the user.

An interface may be used in conjunction with the various components set forth in FIGS. 1A and 1A-1. In one embodiment, such interface may include at least in part the Open Graphics Library (OpenGL®), Direct3D™ application program interfaces (APIs), a proprietary application program interface, or the like.

In use, a shader program may be generated for use with the shader 153 of FIGS. 1A-1. Initially, a single file associated with a graphics effect is a selected. Such file is then read and processed. In the context of the present description, a file may include any type of data structure, stream of data, network connection, etc. capable of communicating information. A shader program is subsequently generated based on the processing of the file to apply the graphics effect to an object. More information will now be set forth regarding various exemplary techniques in carrying out such functionality.

Figures 1, 1A, 2:
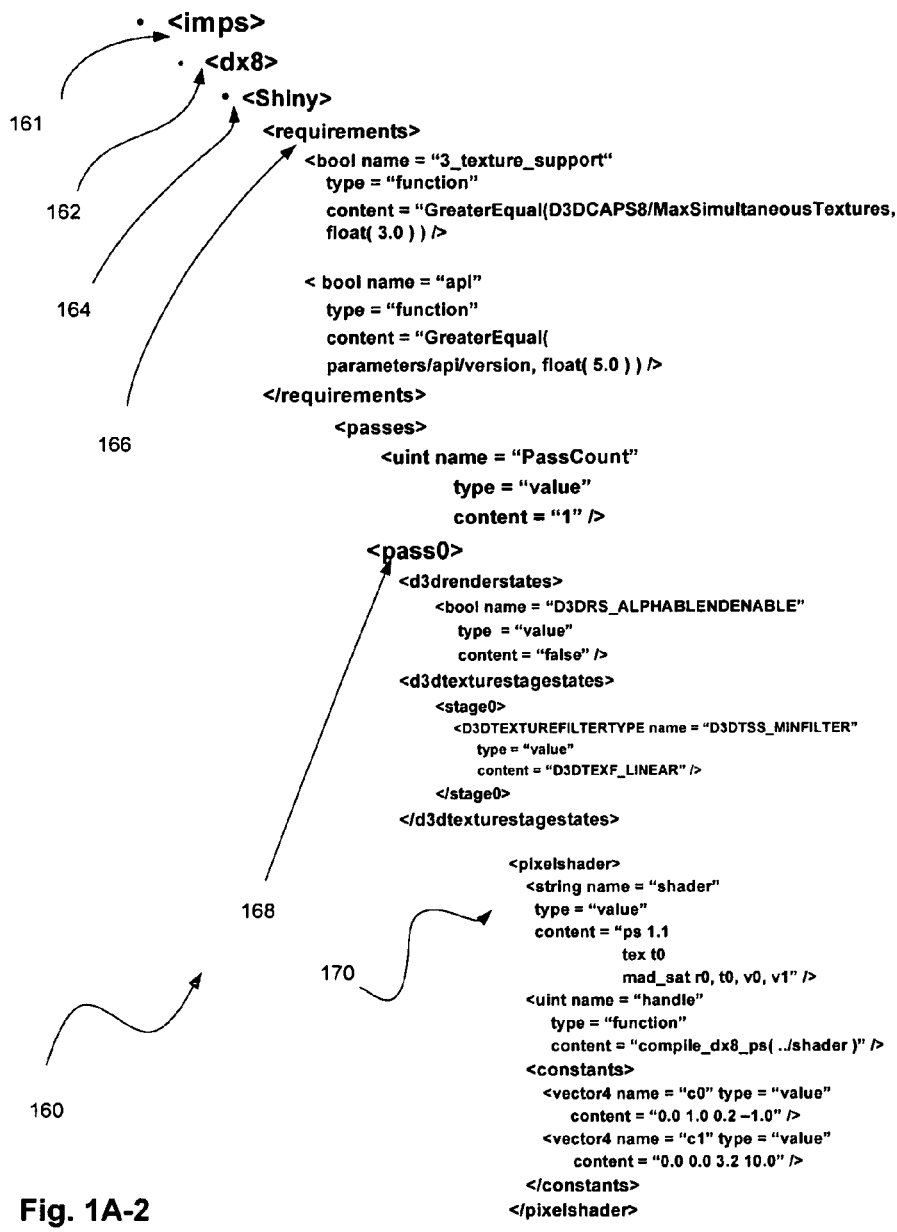

FIGS. 1A-2 illustrates an exemplary file 160 that may be used to generate a shader program, in accordance with one embodiment. It should be noted that the present file 160 may be used to generate a shader program in the context of the foregoing architecture of FIGS. 1A and 1A-1, or any another architecture desired.

An exemplary file 160 is set forth in FIGS. 6A-6I. The lines in FIGS. 6A-6I are numbered for reference.

In one embodiment, the file 160 may be selected from a library of files each associated with a unique graphics effect. Internally, such libraries may use a particular class. Such class may be a hierarchical database very similar to a file system. It may support links and functions, and allow user-defined types and functions to override and intermix with the pre-existing functions. Other functions may also be involved including volatile functions that have the same structure as a regular function, however, volatile functions are always executed. Additionally, no time is spent checking if parameter dependencies have changed, as in the case of a regular function. Any function called by a volatile function is also treated as volatile for the duration of the function. The class is where files 160 may be stored and accessed at runtime. Further, the class may be dumped to text at any time to facilitate debugging and archiving.

As an option, the class may be compiled in order to make sure that links point to a valid field of the same type, and that functions are well formed. As an option, the function strings may be compiled into an internal byte-code style representation. The class may also support just-in-time compilation, so that if a function is never called, it is never compiled. One may compile sub-trees of the class as needed to ensure links and functions are correct and fully specified.

In another embodiment, the file 160 may be written in an extensible markup language (XML). Moreover, the file 160 may include a text file. The example file 160 shown in FIGS. 6A-6I is in XML.

As an option, the file 160 may include implementation data 161 capable of being processed to generate the shader program for different hardware graphics pipeline platforms. For example, the implementation data 161 may represent a variety of platforms (i.e. hardware graphics chips manufactured by different graphics companies for various purposes).

Still yet, the file 160 may include interface data 162 capable of being processed to generate the shader program for different graphics application program interfaces. In particular, the file 160 may be processed in a way to generate shader programs for working in conjunction with various different graphics application program interfaces (i.e. OpenGL®, Direct 3D™, etc). In FIGS. 6A-6I, the tag "<imps>" at line 30 designates implementations, and lines 31 and 378 designate the beginning of DirectX™8 and OpenGL® implementations, respectively.

With continuing reference to 1A-2, a textual descriptive object 164 may be provided for identifying a graphics effect associated with the file using intuitive text.

For example, the graphics effect may include a "shiny" characteristic, as shown in FIGS. 1A-2, and at lines 2 and 3 in FIGS. 6A-6I. Of course, any other type of visual effect (i.e. motion blur, etc.) may be described by the textual descriptive object 164. Ideally, such textual descriptive object 164 allows an intuitive identification of the graphics effect associated with a shader program to be generated.

Further provided is at least one requirements object 166 for identifying requirements necessary to generate the shader program. As shown, various requirements are set forth for each of a plurality of render passes identified by way of pass identifiers 168. For example, each render pass may have different required textures, render states, multi-pass effects, and sources of L-vectors, as well as tangent space requirements, texture type requirements, or any other type of capability required to display a shader program correctly. Optionally, the requirements may even include a call back function.

In FIGS. 6A-6I, the requirements for the DirectX8 are potentially different for the three implementations shown: (1) implementation 1, starting at line 32, has its requirements described in lines 37 through 50; (2) implementation 2, starting at line 185, has its requirements described in lines 190 through 199; and (3) implementation 3, starting at line 282, has its requirements described in lines 287 through 296. Note that implementations 2 and 3 have the same requirements, but implementation 1 has different requirements.

In general, the requirements may include a default set of requirements, which may be optionally custom tailored. Such tailorable requirements, or "tweakables," represent artist-controllable parameters for shader-specific items. Tweakables are required by a shader program, but are not necessarily exposed through standard tool paths. Shader program authors may decide which parts of the shader program to expose to artist manipulation. Tweakables may refer to any requirement ranging from a transparency factor to an alpha blend factor. Table 1 illustrates exemplary tweakables in the context of the file 160 of FIGS. 1A-1.

TABLE 1

```
<tweakables>
    <shininess>
        <string name = "description" type = "value"
            content = "Relative Opacity" />
        <string name = "type" type = "value"
            content = "float" />
        <string name = "field" type = "value"
            content = "../../settings/opacity" />
        <string name = "gui" type = "value"
            content = "slider" />
        <float name = "min" type = "value"
            content = "0.0 "/>
        <float name = "max" type = "value"
            content = "1.0 "/>
        <float name = "step" type = "value"
            content = "0.1 "/>
    </shininess>
</tweakables>
```

In FIGS. 6A-6T, the tweakables are designated at lines 14 through 29. The tweakables are generally outside the designation of any of the implementations because they generally apply to all the implementations. In this example, a minimum value (lines 22 and 23), a maximum value (lines 24 and 25), and a step size (lines 26 and 27) are included.

Further provided with the file 160 is a plurality of shader code segments 170 capable of executing the graphics effect in a plurality of operating environments. As shown, such shader code segments 170 include a syntax including a name, a type and a content. Still yet, the file may be capable of referencing both compiled and un-compiled shader program code.

As shown in FIGS. 1A-2, the shader code segments 170 may be organized in terms of the different operating environments. Thus, the present embodiment may optionally be used as a reference for obtaining desired shader code segments 170.

In FIGS. 6A-6I, an example of shader code is shown at lines 60 through 88.

Table 2 illustrates a summary of various elements of an exemplary shader implementation in Direct3D® 8.

TABLE 2

1. Preamble/declaration: These elements provide a priority for a particular implementation/interface, and a string description of the implementation/interface.
2. Requirements: These specify the various requirements for the implementation/interface to run correctly. In particular, they include the Dx8 caps that are required for the shader. All requirements evaluate to type 'bool'.
3. Texture handles: These refer to texture handles that are created either from data in texture files (i.e. png, dds, tga, etc.) or generated textures such as normalization cube maps. The handles can be referenced in subsequent sections of the file, and are independent of the render pass or texture unit.
4. Vertex shader & Pixel Shader Handles: These are the dx8-provided handles that are created either compiled shader strings or from precompiled shader files. The handles can be referenced in subsequent sections of the file, and are independent of the render pass or texture unit. If a user does not want a vertex shader applied, the handle may be set to the FVF code being used. If the user does not specify a pixel shader for a pass, it may be set to zero, thus turning off pixel shading.
5. Vertex Mapping: This section is highly recommended and encouraged, but optional. This is where one may specify the meaning of the various vertex attributes, (such as v0, v1, v5) in a shader program. By specifying the mapping and exposing the shader program in string form, an application with a different geometry layout may have the shader program re-written with the new geometry format.
6. A shader implementation can comprise multiple render passes, each with unique render states, texture stage states, vertex mapping, pixel and vertex shaders.
7. There may be a file that represents the default render and texture stage states for the system. If one does not specify a renderstate or texture stage state in a pass of a shader program, it is reset to the default state in the file. By using the file, one may gain improved interoperability with shader programs that use the same file. If one does not wish to make changes, he or she can do so, but at the cost of having to update shaders to reflect the render state changes.

Table 3 illustrates a summary of various elements of an exemplary shader implementation in OpenGL®.

TABLE 3

1. Preamble/declaration: These elements provide a priority for the implementation/interface, and a string description of the implementation/interface.
2. Requirements: These specify the various requirements for the implementation/interface to run correctly. In particular, they include the OpenGL ® extensions that are required for the shader. If these are not available, the OpenGL implementation may not load the shader program.
3. Texture handles: These refer to texture handles that are created either from data in texture files (i.e. png, dds, tga, etc.) or generated textures such as normalization cube maps. The handles can be referenced in subsequent sections of the file, and are independent of the render pass or texture unit.
4. A shader implementation can comprise multiple render passes, each with a unique vertex program, texture shader and register combiner definitions.

Figure 1B:
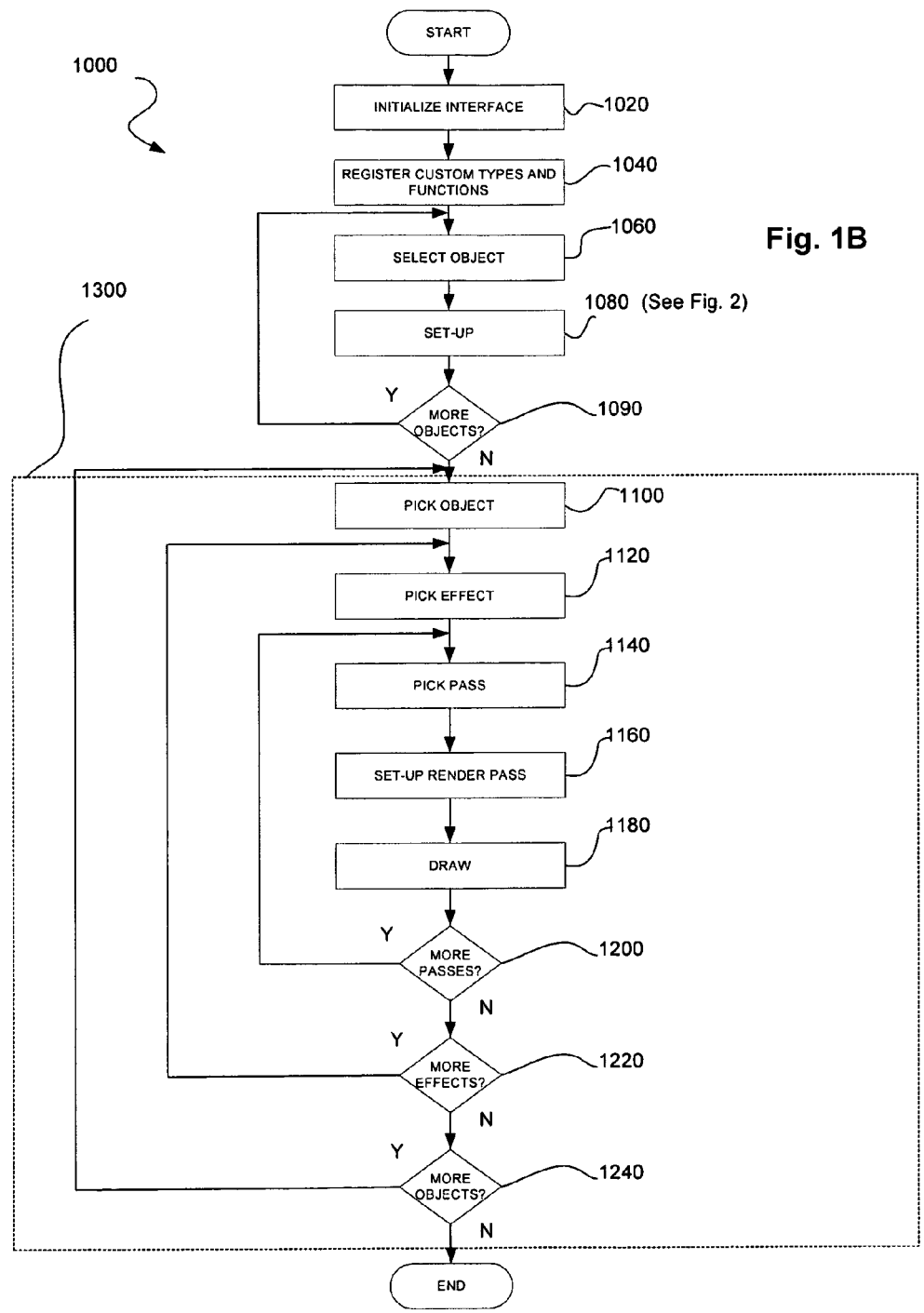
FIGS. 1B and 1C each illustrate a method for generating a shader program, in accordance with one embodiment.

FIG. 1B illustrates a method 1000 for generating a shader program, in accordance with one embodiment. This method 1000 is generally done under control of an application program that renders an image with one or more three-dimensional objects. While the present method 1000 may be implemented in the context of the framework of the foregoing figures, it may readily be implemented in the context of any desired architecture and data structure. As an option, the various operations may be carried out utilizing an interface [i.e. Component Object Model (COM)], plug-in, etc. Moreover, various steps may be optionally excluded and/or reordered during the course of the processing that is required to generate the shader program.

Initially, in operation 1020, the processing may include initializing an interface. In a preferred embodiment, the interface is an API to the library of effects, and can be implemented as a plug-in. Next, any number of custom types and custom functions are registered in operation 1040. Thus, the shader program may be generated based on the registered custom types and/or custom functions. By this feature, the present embodiment allows a user to customize the resulting shader program.

Next, one of the objects to be rendered is selected in operation 1060 after which such object is set up in operation 1080. This set up process is carried out for each of a plurality of objects to be rendered, as indicated by decision 1090. Thus, a plurality of objects is set up. This preparation facilitates the generation of the shader program by taking various information relating to the implementation and interface associated with the environment in which the shader program is to be used. More information relating to an exemplary embodiment of such set up operation will be set forth in greater detail during reference to FIGS. 2 through 4.

With continuing reference to FIG. 1B, one of the objects is selected along with one of a plurality of graphics effects, and a render pass. See operations 1100-1140. The selected render pass is then set up in operation 1160 after which the selected object is drawn with the selected graphics effect. See operation 1180. As an option, the render pass may be set up by pointing to parameters. The shader program may then be generated based on the parameters. Further, the object may be drawn with the selected graphics effect utilizing attributes supplied by an application. Parameters that are not passed in during render pass setup 1160 generally use default values supplied in the file 160. The parameters can be supplied in any order, and the use of pointers to the parameters provides a mechanism for parameters to be shared amongst a plurality of objects.

During a rendering pass, it may be determined whether more render passes exist, and another render pass selected if more render passes exist. See decision 1200. Further, it may be determined whether more graphics effects exist, and another graphics effect selected if more graphics effects exist. Note decision 1220. Still yet, it may be determined whether more objects exist, and another object selected if more objects exist, as indicated by decision 1240.

It should be noted that the various operations included in the box 1300 may be carried out in any order. See, for example, FIG. 1C. Of course, any feasible permutation of the operations may be employed.

Figure 1C:
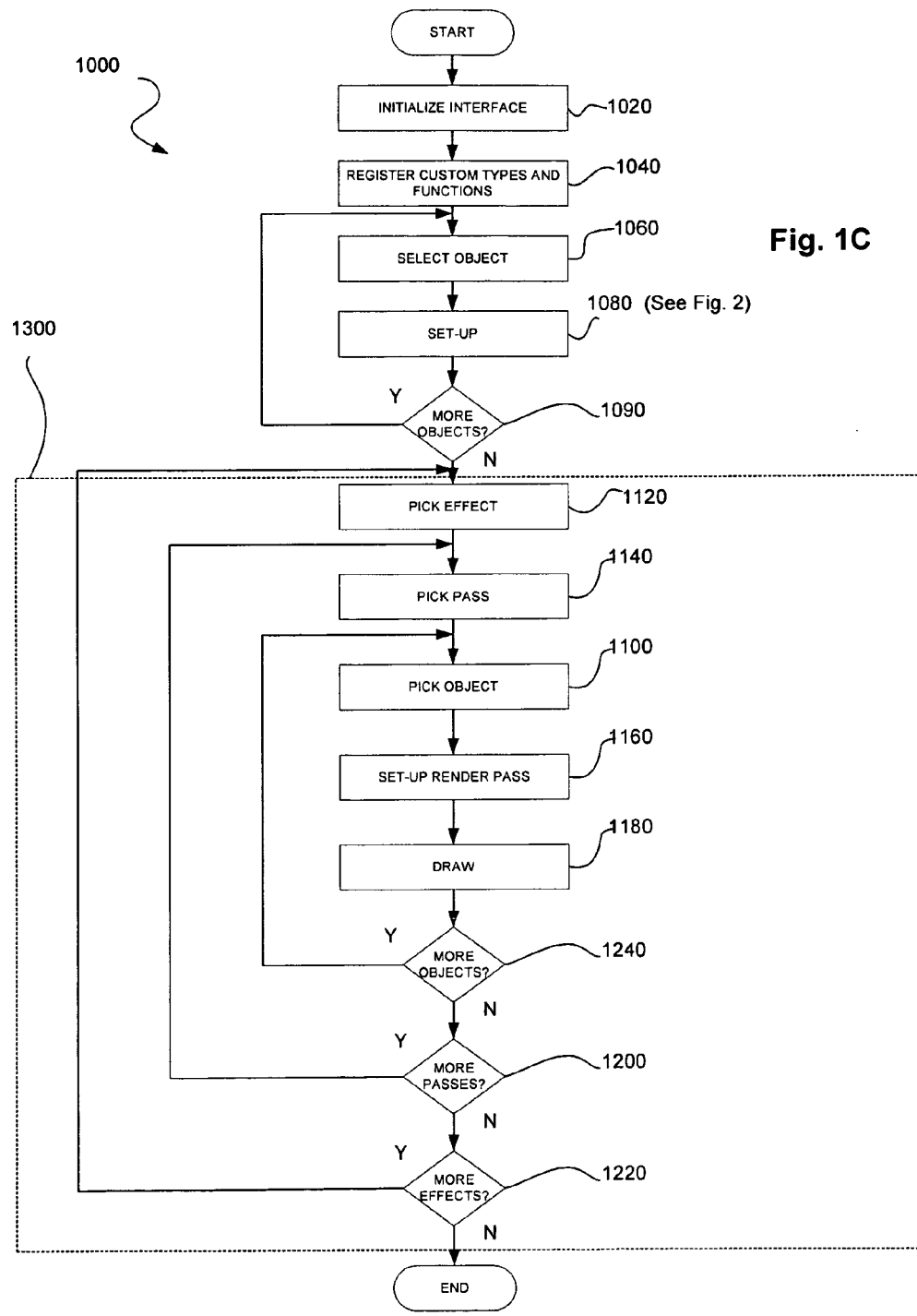
Figure 2:
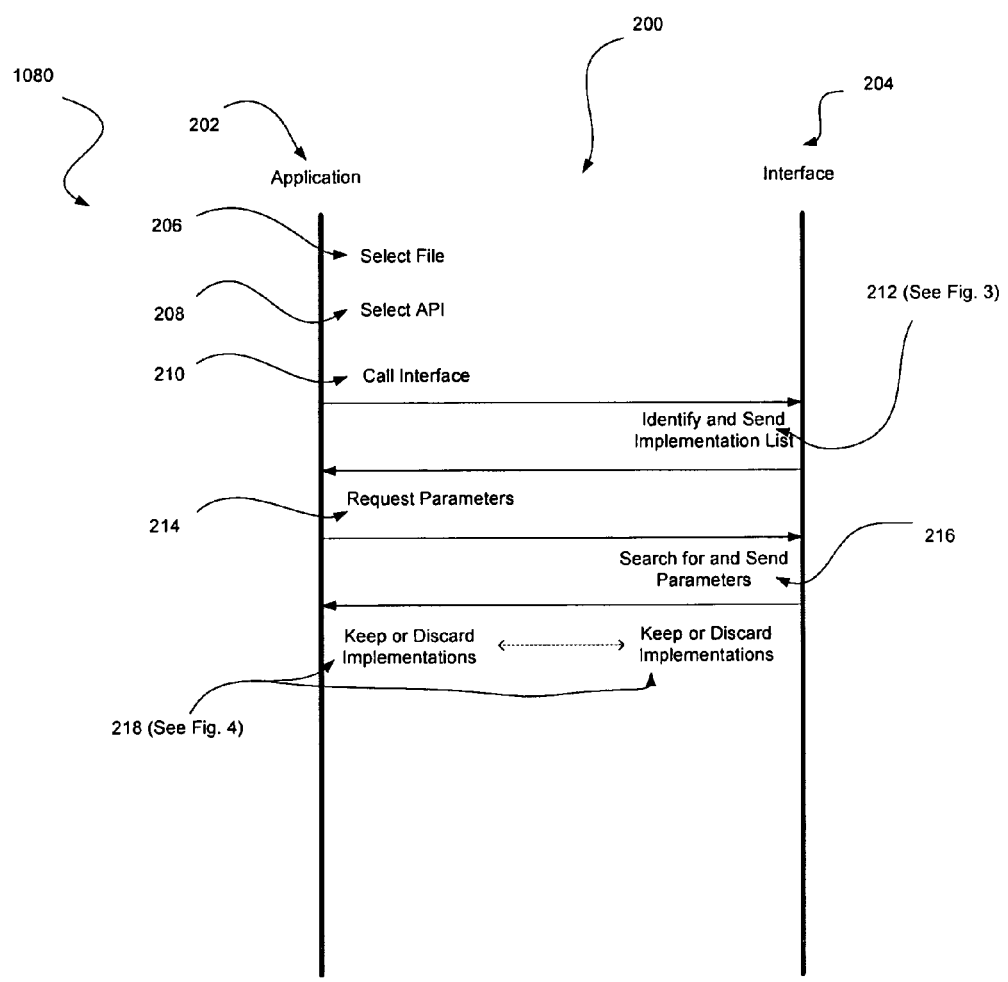

FIG. 2 illustrates an "effect binding" method 200 by which objects are set up in accordance with operation 1080 of FIGS. 1B and 1C. Such method 200 is carried out in the context of an exemplary system including an interface 204 and an application program 202 for working in conjunction to process the file. Thus, the shader program is generated based on the processing of the file to apply the graphics effect to the object. Of course, the present method 200 may be implemented in the context of any desired system.

As mentioned earlier, the processing includes setting up a plurality of objects. From the perspective of the application program 202 in the context of the present system embodiment, this may be accomplished by selecting a file associated with a desired graphics effect in operation 206. In one embodiment, a .dll file may be used by a tool or graphics engine to read the file.

Next, in operation 208, a graphics application program interface is selected. Thereafter, the interface 204 is called. See operation 210. In response to such call, implementation data representing a plurality of different hardware graphics pipeline platforms is received based on the selection of the particular graphics application program interface. In one embodiment, any platform that supports the selected graphics application program interface may be represented by the implementation data.

Next, parameters are requested and received based on the implementation data, as indicated by operation 214. Further, it may be decided which of the hardware graphics pipeline platforms to use based on the parameters in operation 218. As will soon become apparent, this decision may be made using the application program 202 in conjunction with the interface 204. More information relating to such decisions will be set forth in greater detail during reference to FIG. 4.

From the perspective of the interface 204 in the context of the present system embodiment, the objects are set up by generating implementation data representing a plurality of different hardware graphics pipeline platforms, in response to the call of operation 210. Note operation 212. More information as how this may be accomplished in accordance with one embodiment will be set forth with reference to FIG. 3. Parameters are then generated based on the implementation data in operation 216. As mentioned earlier, the interface 204 works in conjunction with the application 202 in operation 218 to decide as to which of the hardware graphics pipeline platforms to use based on the parameters.

As an option, the interface 204 may be capable of generating primitives. For example, a sphere may be generated from a point and radius, etc. This can be done by defining a geometry generator (for example, with a tag "<geogenerator>"), which is analogous to the pixel shader (as shown with the tag "<pixelshader>") or the vertex shader (as shown with the tag <vertexshader>"). This primitive generation technique may be useful in many contexts. For example, it may be used when generating grass or other similar objects.

Figure 3:
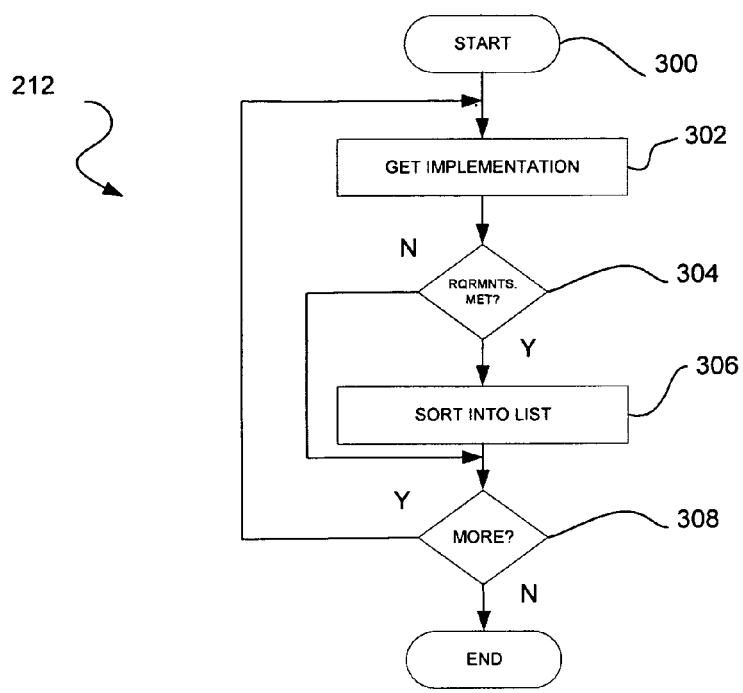
FIG. 3 illustrates a method for generating implementation data representing a plurality of different hardware graphics pipeline platforms, in accordance with operation 212 of FIG. 2.

FIG. 3 illustrates a method 300 for generating implementation data representing a plurality of different hardware graphics pipeline platforms, in accordance with operation 212 of FIG. 2. This method 300 is done within the interface 204. It should be noted that the present method 300 is set forth for illustrative purposes only, and should not be construed as limiting in any manner.

As shown in FIG. 3, implementation data is retrieved in operation 302, which, for example, finds all the implementations (inside the designation "<imps>", shown at line 30 in FIGS. 6A-6I) in the file 160. Next, it is determined whether the implementation data meets the requirements outlined under the appropriate graphics application program interface in the current file. If it is determined in decision 304 that the requirements are met, the implementation data is sorted in a list in operation 306. This may be accomplished using a floating point priority provided by a user. This process is continued for all implementation data associated with the selected graphics application program interface. Note decision 308.

Figure 4:
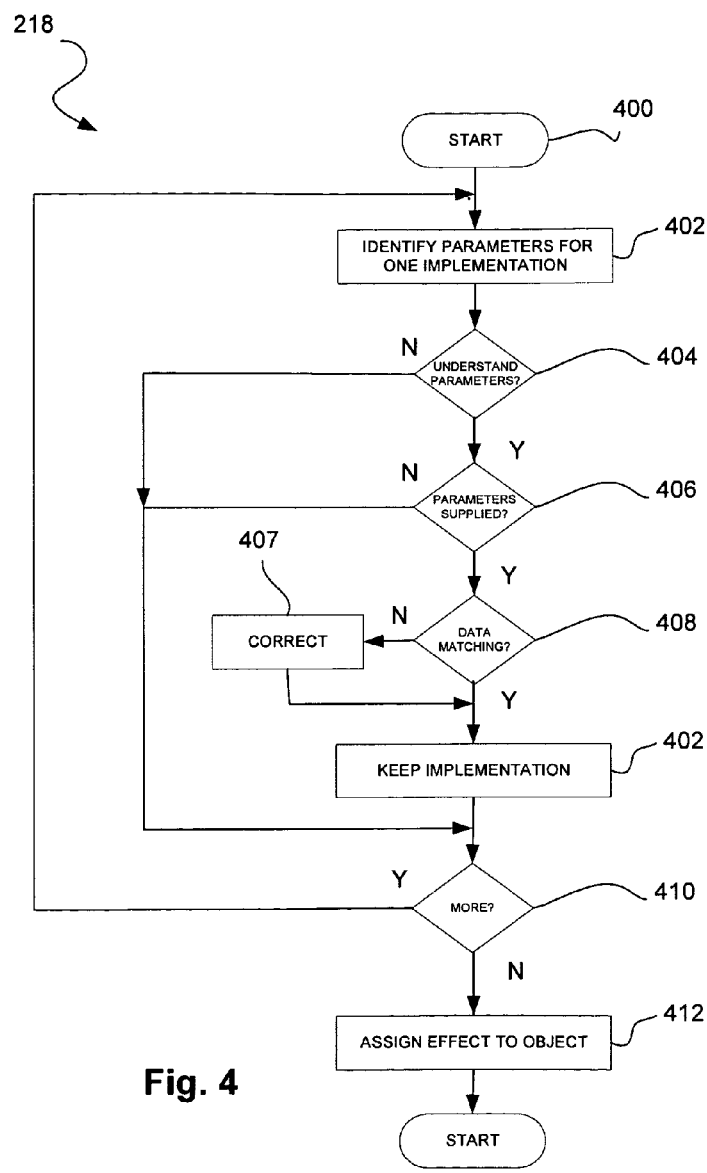
FIG. 4 illustrates an exemplary method by which it may be decided which of the hardware graphics pipeline platforms to use, in accordance with operation 218 of FIG. 2.

FIG. 4 illustrates an exemplary method 400 by which it may be decided which of the hardware graphics pipeline platforms to use, in accordance with operation 218 of FIG. 2. Generally, this method 400 is performed by the application 202. Again, it should be noted that the present method 400 is set forth for illustrative purposes only, and should not be construed as limiting in any manner.

Initially, in operation 402, the parameters associated with a particular implementation are identified. This is done by calling the interface and requesting the list, of parameters for an implementation. Again, each implementation may correspond with a specific platform (i.e. hardware graphics chips manufactured by different graphics companies).

It is then determined, in decision 404, whether the parameters supplied by the interface are understood by the application (i.e., whether the parameter names can be correctly interpreted by the application). Further, it is determined whether the parameters can be supplied by the application. See decision 406. Both of these decisions must render a positive response if the present implementation is to be utilized by the application program. As an option, the current decisions can be carried out in a place other than the application program.

Next, in operation 408, it is determined whether data is matching. If not, any mismatching data is corrected in operation 407. The correction operation 407 can include, for example, swapping the order of the data and/or making the needed data from existing data. Unlike the previous decisions, the present decision 408 may optionally be carried out by the interface.

The foregoing decisions are made for each of the implementations that are available. Sec decision 410. Next, graphic effects are assigned to the object in operation 412. Generally, the application selects from the implementations kept in operation 402.

In order to allow a user to visually experiment and use a shader program, an optional graphical user interface is provided. In use, the aforementioned graphics effect may be displayed utilizing a graphical user interface. Further, the graphics effect may be capable of being altered by a user utilizing the graphical user interface. In particular, the graphics effect may be capable of being altered by altering parameters (i.e. tweakables), and the shader program may be generated based on the altered parameters. This may be accomplished by way of a sliders, edit boxes, etc. The parameters may be altered by tweaking the associated file.

Another graphical user interface may also be provided in which a plurality of graphics effects are displayed for allowing a user to select one graphics effect. Such selected graphics effect is then displayed as applied to an object using a file. Further, the file is modified based on user input and the file is processed. Thus, the shader program may be generated based on the processing of the file.

Figure 5:
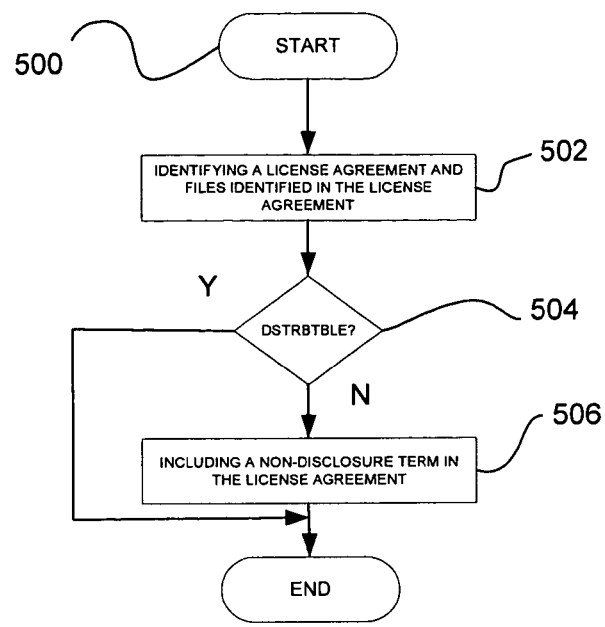
FIG. 5 illustrates a business method associated with the present invention.

FIG. 5 illustrates a business method 500 associated with the present invention. In use, the file (i.e. see FIGS. 1A-1) may be sold or otherwise distributed by way of a license agreement. The various shader programs or portions thereof in the file may or may not be distributable to the public for one reason or another. The present computer-implemented business method 500 allows the automated generation of a license agreement that takes into consideration whether non-distributable shader programs exist in a particular file to be licensed.

Initially, in operation 502, a license agreement stored in memory is identified. Further, files associated with the license agreement are identified.

It is then determined as to whether one or more of the files are not distributable at least in part. Sec decision 506. This may be accomplished by specifically tagging non-distributable code, or comparing the contents of the file with a database of known non-distributable code.

If it is determined that one or more files are not distributable in decision 506, a non-disclosure term is included in the license agreement. This non-disclosure term may be of a boilerplate nature and incorporated into the license agreement automatically in any other manner that is well known to those of ordinary skill. See operation 508.

In a simplified associated computer-implemented method, a technique is provided for determining whether a file is distributable. Such method may include identifying a file stored in memory, determining whether the file is distributable, and simply indicating whether the file is distributable.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents. The order of elements within claims does not indicate any particular order of steps or operations.

What is claimed is:

1. A system for generating a shader program, comprising:
   an interface; and
   an application program for working in conjunction with the interface to process a file and to identify parameters associated with an implementation from the file by calling the interface and requesting a list of parameters for the implementation, determining if the parameters supplied by the interface are understood by the application program, and determining whether the parameters can be supplied by the application program;
   wherein a shader program is capable of being generated based on the processing of the file to apply a graphics effect to an object, the shader program generated for a platform represented by the implementation, based on the parameters.

2. The system as recited in claim 1, wherein the file includes a plurality of interface data capable of being processed to generate the shader program for different graphics application program interfaces.

3. The system as recited in claim 1, wherein the file includes a plurality of implementation data capable of being processed to generate the shader program for different hardware graphics pipeline platforms.

4. The system as recited in claim 1, wherein the file is written in an extensible markup language (XML).

5. The system as recited in claim 1, wherein at least one of the processing, and the generating is carried out utilizing a plug-in.

6. The system as recited in claim 1, wherein the processing is carried out utilizing the interface.

7. The system as recited in claim 6, wherein the interface includes a Component Object Model (COM) interface.

8. The system as recited in claim 6, wherein the processing includes initializing the interface.

9. The system as recited in claim 1, wherein the processing includes registering at least one of custom types and custom functions, the shader program being generated based on the at least one of registered custom types and custom functions.

10. The system as recited in claim 1, wherein the processing includes selecting one of a plurality of objects.

11. The system as recited in claim 1, wherein the processing includes selecting one of a plurality of graphics effects.

12. The system as recited in claim 1, wherein the processing includes determining whether more than one render pass exists, and selecting another render pass if more than one render pass exists.

13. The system as recited in claim 1, wherein the processing includes determining whether more than one object exists, and selecting another object if more than one object exists.

14. The system as recited in claim 1, wherein a default set of requirements is included in the file.

15. The system as recited in claim 1, wherein the shader program is capable of being altered by tweaking the file.

16. The system as recited in claim 1, wherein the file includes a syntax including at least one of a name, a type and a content.

17. The system as recited in claim 1, wherein the file is capable of referencing both compiled and un-compiled code.

18. The system as recited in claim 1, further comprising retrieving the implementation data from the file, and determining if the implementation data meets requirements outlined under an appropriate graphics application program interface in the file, wherein if the requirements are met, the implementation data is sorted in a list using a floating point priority provided by a user.

19. The system as recited in claim 1, wherein the implementation corresponds with the platform including a hardware graphic chip and data associated with the implementation is designated within the file inside a set of <imps> and </imps> tags for the platform.

20. The system as recited in claim 1, wherein a textual descriptive object is provided for identifying a graphics effect associated with the file using intuitive text.

21. The system as recited in claim 1, wherein a requirements object is provided for identifying requirements necessary to generate the shader program.

22. A computer program product embodied on a non-transitory computer readable storage medium for generating a shade/program, comprising:
   computer code for selecting a file associated with a graphics effect;
   computer code for processing the file;
   computer code for identifying parameters associated with an implementation from the file by calling an interface and requesting a list of parameters for the implementation, determining if the parameters supplied by the interface are understood by an application program, and determining whether the parameters can be supplied by the application program; and
   computer code for generating the shader program based on the processing of the file to apply the graphics effect to an object, the shader program generated for a platform represented by the implementation, based on the parameters.

23. A data structure embodied on a non-transitory computer readable storage medium, comprising:
   a file identifying a graphics effect;
   wherein the data structure is utilized such that parameters associated with an implementation from the file are identified by calling an interface and requesting a list of parameters for the implementation, determining if the parameters supplied by the interface are understood by an application program, and determining whether the parameters can be supplied by the application program;
   wherein the data structure is utilized such that a shader program is capable of being generated based on the file, the shader program generated for a platform represented by the implementation, based on the parameters.

* * * * *

UNITED STATES PATENT AND TRADEMARK OFFICE
CERTIFICATE OF CORRECTION

| | | |
|---|---|---|
| PATENT NO. | : 8,106,904 B2 | Page 1 of 1 |
| APPLICATION NO. | : 11/181180 | |
| DATED | : January 31, 2012 | |
| INVENTOR(S) | : Dietrich, Jr. et al. | |

It is certified that error appears in the above-identified patent and that said Letters Patent is hereby corrected as shown below:

Claim 22, col. 14, line 30; replace "shade/" with --shader--.

Signed and Sealed this
Eighth Day of May, 2012

David J. Kappos
*Director of the United States Patent and Trademark Office*